United States Patent

[11] 3,573,447

[72] Inventor Gerald J. Erickson
St. Paul, Minn.
[21] Appl. No. 806,197
[22] Filed Mar. 11, 1969
[45] Patented Apr. 6, 1971
[73] Assignee Sperry Rand Corporation
New York, N.Y.

[54] LOGICAL MULTIPLY SCHEME FOR BINARY COMPUTER
4 Claims, 2 Drawing Figs.

[52] U.S. Cl. .......... 235/164, 235/152, 307/203, 328/92, 235/156
[51] Int. Cl. .......... G06f 7/39
[50] Field of Search .......... 235/152, 164, 156; 307/203, 218; 328/92

[56] References Cited
UNITED STATES PATENTS
3,291,974 12/1966 Even .......... 235/152X
3,454,310 7/1969 Wilhelm, Jr. .......... 235/152X
OTHER REFERENCES
M.S. Schmookler, LOGICAL CONNECTIVES, IBM Technical Disclosure Bulletin, Vol. 6, No. 1, June 1963.

*Primary Examiner*—Malcolm A. Morrison
*Assistant Examiner*—Charles E. Atkinson
*Attorneys*—Kenneth T. Grace, Thomas J. Nikolai and John P. Dority ABSTRACT: A scheme for performing a logical multiply operation in a computer using binary arithmetic and double-gated logic, i.e., both the input set and clear gates of the data register stages are simultaneously enabled, for data transfers into the data register. The scheme involves double gating a first operand into the data register and then transferring only the O bits of a second operand into the data register by enabling only the input clear gates of the data register stages. This operation achieves a logical multiply of the first and second operands.

INVENTOR
GERALD J. ERICKSON
BY Kenneth S. Grace
ATTORNEY

LOGICAL MULTIPLY SCHEME FOR BINARY COMPUTER

BACKGROUND OF THE INVENTION

In conventional binary computer organization, data registers are made up of a plurality of ordered stages each stage comprising a bistable element having input set and clear gates for receiving the true and the complement, respectively, ordered-bit representations of the like-ordered bits of a multibit data word. For data transfers into the data register both the input set and clear gates of all the data register stages are simultaneously enabled, i.e., are double gated.

Conventional logical multiply operations in such a system usually consist of transferring, or loading, a first operand in the data register by double-gating the like-ordered bits of a first operand into the like-ordered stages of the data register. Next, those stages of the data register whose like-ordered bits of a second operand are O's are selectively cleared, the remaining stages of the data register remaining unchanged. This operation is conventionally called a "mask" operation with the second operand called the mask. Accordingly, in such double-gated systems the mask 1's are selectively disabled, or blocked, during the logical multiply operation.

SUMMARY OF THE INVENTION

The present invention involves double-gating the first operand into the data register and then transferring only the ordered O bits of the second operand into the data register by enabling only the input clear gates of the data register like-ordered stages.

System operation includes transferring an instruction word IW from memory Mϕ into the instruction register Iϕ. The function code portion Fϕ of the instruction word is translated by the function code translator causing a data register timer to generate first and second data register timing signals; a first data register timing signal for enabling both the input set and clear gates of the data register stages, and a second data register timing signal for enabling only the input clear gates of the data register stages. The first data register timing signal transfers the first operand OP1 from memory into the data register Dϕ while the second data register timing signal transfers from memory only the O bits of the second operand OP2 into the like-ordered data register stages effecting the logical multiply operation.

DESCRIPTION OF THE PREFERRED EMBODIMENT

Figures 1, 2:
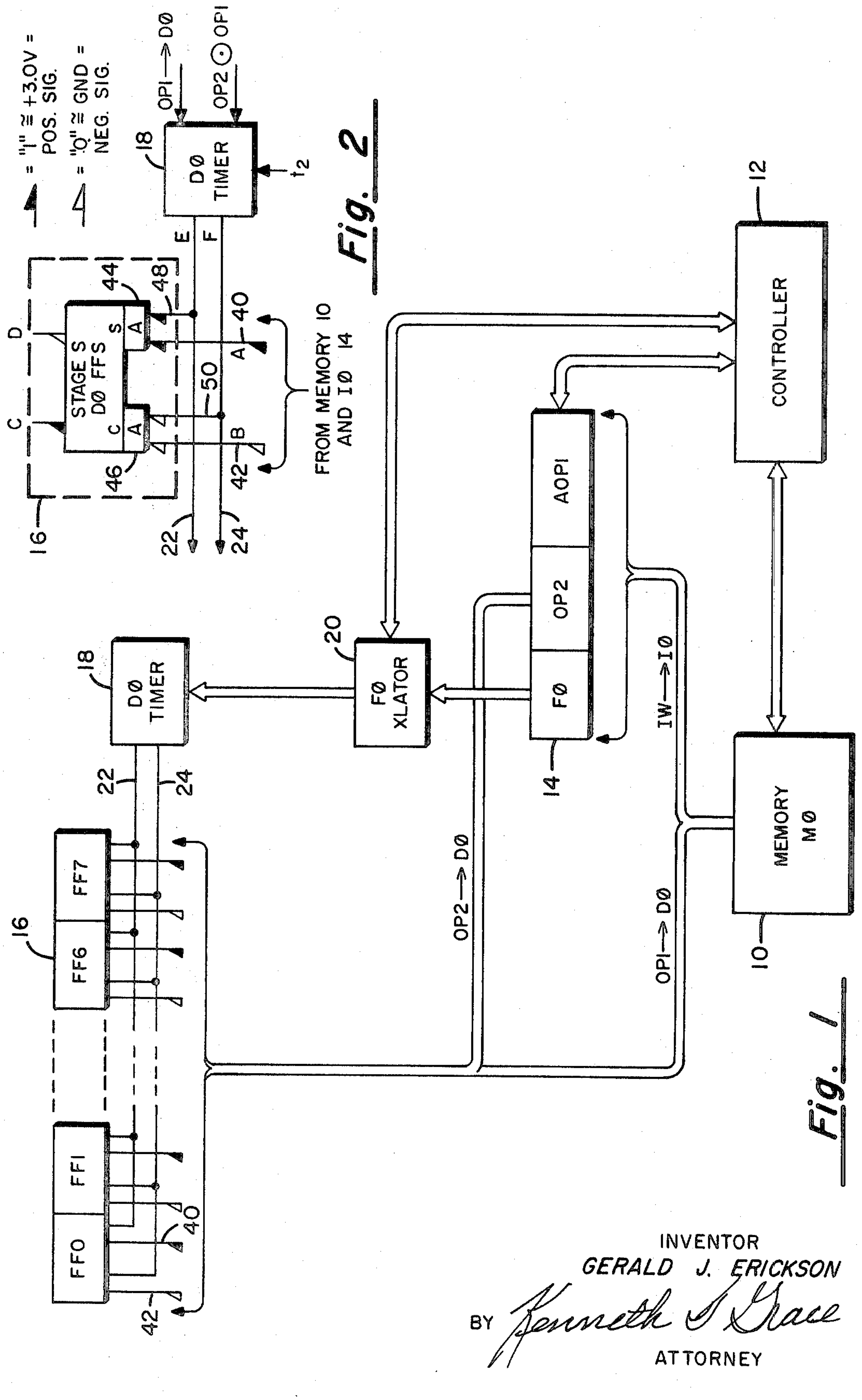
FIG. 1 is an illustration of a block diagram of a computer system incorporating a present invention.
FIG. 2 is an illustration of a block diagram of a like-ordered stage of the data register and memory with the data register timer.

With particular reference to FIG. 1 there is presented an illustration of a block diagram of a computer system incorporating the present invention. In this system the multibit instruction words, IW, and operands, OP, are stored in memory 10, Mϕ, and are, under control of controller 12, selectively transferred into instruction register 14, Iϕ, and data register 16, Dϕ, respectively. Memory 10 may be a conventional random access core, or plated wire, memory while controller 12 may be described as consisting of those portions of a computer system essential for generating timing and control signals for operating the computer's arithmetic section and effecting information transfer between the arithmetic section and memory 10.

Data register 16 is comprised of a plurality of ordered stages FFO—FF7 each stage comprising a bistable element having input set and clear gates for receiving the true and the complement, respectively, ordered-bit representations of the like-ordered bits of a multibit data word. For data transfers into the data register 16 both the input set and clear gates of all the data register stages FFO—FF7 are simultaneously enabled by data register timer 18 coupling enabling signals to input set gate enable line 22 and input clear gate enable line 24. This data transfer operation is, as stated above conventional, prior art operation.

System operation includes, under control of controller 12, transferring an instruction word, IW, from memory 10 into instruction word register 14, $IW \rightarrow I\phi$. The function code portion Fϕ of the instruction word, IW, is translated by function code translator 20 causing data register timer 18 to generate first and second data register timing signals; a first data register timing signal for enabling both input set and clear gates of the data register stages FFO—FF7, and a second data register timing signal for enabling the input clear gates and disabling the input set gates of data register stages FFO—FF7. The first data register timing signal transfers the first operand OP1 from the address AOP1 in memory 10 that is designated in the instruction word, which is held in instruction register 14, into data register 16, thus effecting the data transfer operation $OP1 \rightarrow D\phi$. The second data register timing signal transfers into the like-ordered data register stages FF0—FF7 only the ordered O bits of the second operand OP2 portion of the instruction word that is held in instruction register 14, thus effecting the logical multiply operation $OP2 \cdot OP1$.

With particular reference to FIG. 2 there is represented an illustration of an S-ordered stage of data register 16 as associated with data register timer 18. The true and the complement bit representations of the ordered bit S of the data word or operand held in memory 10 or instruction register 16 are coupled to AND gates 44, 46, respectively, which AND gates 44, 46 are selectively enabled or disabled by first and second data register timing signals on lines 22, 24 and their associated lines 48, 50.

To best understand the function of the embodiment of FIG. 2 in the system of FIG. 1 a general discussion of the pertinent operation of the system of FIG. 1, as it relates to the present invention, may be generally described in the following steps.

1. Controller 12, in proceeding through its stored program in memory 10, transfers into instruction register 14 an instruction word which by its function code portion Fϕ requires a logical multiply operation, $OP2 \cdot OP1$.

2. Function code translator 20 translates the function code Fϕ causing data register timer 18 to selectively, alternatively generate;

a first data register timing signal for simultaneously enabling the input set and clear gates 44 and 46, respectively, of all of the data register stages FFO—FF7, a second data register timing signal for simultaneously enabling the input clear gates 46 and disabling the input set gates 44 of all of the data register stages FFO—FF7.

3. The first operand OP1 address AOP1 in the instruction word held in instruction register 14 initiates, through controller 12, a data word transfer from memory 10 to data register 16 operation, $OP1 \rightarrow D\phi$, causing the first operand OP1 from memory 10 to be transferred into data register 16 by the first data register timing signal.

4. The second operand OP2 in the instruction word held in instruction register 14, through controller 12, initiates a logical multiply operation, $OP2 \cdot OP1$, causing only the O bits of the second operand OP2 in instruction register 14 to be transferred into data register 16, $OP2 \rightarrow D\phi$, by the second data register timing signal.

To better understand the operation of the embodiment of FIG. 2 there is presented in Table A truth tables associated with the data transfer operation, $OP1 \rightarrow D\phi$ and the logical multiply operation, $OP2 \cdot OP1$. The truth tables of Table A illustrate, in detail, the logical operation of data register 16 as it is selectively controlled by data register timer 18 under control of function code translator 20 for a data transfer operation and a logical multiply operation.

TABLE A

| | A | B | C | D | E | F | Timing |
|---|---|---|---|---|---|---|---|
| Data transfer, OP 1⟶Dϕ | | | 1 | 0 | | | $t_0$ |
| | 1 | 0 | | | | | OP 1 |
| | | | 1 | 0 | 1 | 1 | $t_2$ |
| | | | 0 | 1 | | | $t_0$ |
| | 1 | 0 | | | | | OP 1 |
| | | | 1 | 0 | 1 | 1 | $t_2$ |
| | | | 1 | 0 | | | $t_0$ |
| | 0 | 1 | | | | | OP 1 |
| | | | 0 | 1 | 1 | 1 | $t_2$ |
| | | | 0 | 1 | | | $t_0$ |
| | 0 | 1 | | | | | OP 1 |
| | | | 0 | 1 | 1 | 1 | $t_2$ |
| Logical multiply OP 2 ⊙ OP 1 | | | 1 | 0 | | | OP 1 |
| | 1 | 0 | | | | | OP 2 |
| | | | 1 | 0 | 0 | 1 | $t_2$ |
| | | | 0 | 1 | | | OP 1 |
| | 1 | 0 | | | | | OP 2 |
| | | | 0 | 1 | 0 | 1 | $t_2$ |
| | | | 1 | 0 | | | OP 1 |
| | 0 | 1 | | | | | OP 2 |
| | | | 0 | 1 | 0 | 1 | $t_2$ |
| | | | 0 | 1 | | | OP 1 |
| | 0 | 1 | | | | | OP 2 |
| | | | 0 | 1 | 0 | 1 | $t_2$ |

="1"≅+3.0 v.=Pos. Sig.
="0"≅ GD=Neg. Sig.

As noted in Table A, for a data transfer operation, $OP1 \rightarrow D\phi$, data register timer 18 simultaneously enables both the input set and clear gates of all the register stages FFO—FF7 of data register 16 by coupling a 1 to both lines 22, 24 concurrent with memory 10 register stages coupling the true and the complement ordered-bit representations to the input set and clear gates of the like-ordered stages of data register 16. Further, for the logical multiply operation $OP2 \cdot OP1$, data register timer 18 simultaneously enables the input clear gates and disables the input set gates of all the register stages FFO—FF7 of data register 16 by coupling a 1 to line 24 and O to line 22 concurrent with memory 10 register stages coupling the true and the complement ordered-bit representations to the input set and clear gates of the like-ordered stages of data register 16. Thus, as illustrated in Table A for the data transfer operation, 1's are simultaneously coupled to the E, F inputs of the FF stages on lines 22, 24, respectively, while for the logical multiply operation a O and a 1 are simultaneously coupled to the E, F inputs of the FF stages on lines 22, 24, respectively.

As an example of the above, for the data transfer operation the initial content of the data register stage, represented by the true, complement bit representations C, D, as at time $t_0$, is always erased as at time $t_2$, with a new data word, or operand OP1, bit as contained in the like-ordered memory register stage, represented by the true, complement bit representations A, B, always stored therein at time $t_2$. In contrast, for the logical multiply operation the initial content OP1 of the data register stage, represented by the true, complement bit representations C, D, as at time $t_0$, is selectively erased as at time $t_2$, by the new data word, or operand OP2, bit as contained in the like-ordered instruction register stage, represented by the true, complement bit representations A, B, only when that new data word OP2 like-ordered bit is a O. Otherwise, if the new data word OP2 like-ordered bit is 1 the initial content OP1 of the data register stage is not effected by the logical multiply operation, and, accordingly, it remains in its initial condition.

In consideration of the above it is apparent that applicant has illustrated herein a preferred embodiment of a scheme for performing a logical multiply operation in a computer using binary arithmetic and double-gated logic. It is understood that suitable modifications may be made in the structure as disclosed provided that such modifications come within the spirit and scope of the appended claims.

I claim:

1. In a scheme for preforming a logical multiply operation, the method comprising:

coupling the true and the complement ordered-bit representations of a first operand to the like-ordered input set and input clear gates, respectively, of the like-ordered stages of a data register;

enabling both the input set and input clear gates of all of said stages;

transferring the true and the complement ordered-bit representations of said first operand into the like-ordered stages of said data register;

coupling the true and the complement ordered-bit representations of a second operand to the like-ordered input set and input clear gates, respectively, of the like-ordered stages of said data register;

enabling only the input clear gates of all of the data register stages of said data register;

transferring only the O bits of said second operand into said data register; and preforming a logical multiply operation of said first and second operands upon the transfer of only the O bits of said second operand into said data register.

2. In a scheme for performing a logical multiply operation, the combination comprising:

a data register having a plurality of ordered stages, each stage comprising a bistable element having input set and clear gates for receiving the true and the complement, respectively, ordered-bit representations of the associated like-ordered bits of a multibit data word, said data register holding a first data word;

an instruction register having a plurality of ordered stages for receiving the ordered-bit representations of the associated like-ordered bits of a multibit instruction word, a plurality of said bits defining a function code portion of said instruction word;

means coupled to the function code portion of said instruction register enabling the clear gates and disabling the set gates of said data word register stages for transferring only the O ordered bits of a second data word into the like-ordered stages of said data register thereby performing a logical multiply operation of said first and second data words.

3. In a scheme for performing a logical multiply operation, the combination comprising:

a data register having a plurality of ordered stages, each stage comprising a bistable element having input set and clear gates for receiving the true and the complement, respectively, ordered-bit representations of the associated like-ordered bits of a multibit data word;

an instruction register having a plurality of ordered stages for receiving the ordered-bit representations of the associated like-ordered bits of multibit instruction word, a plurality of said bits defining a function code portion of said instruction word;

a function code translator;

means coupling the function code portion of said instruction register to said function code translator for enabling said function code translator to translate said function code and to generate first and second control signals;

means coupled to said first control signal enabling said set and clear gates of said data word register for transferring a first data word into said data register; and means coupled to said second control signal enabling said clear gates and disabling said set gates for transferring only the O ordered bits of a second data word into the like-ordered stages of said data register thereby performing a logical multiply operation of said first and second data words.

4. In a scheme for performing a logical multiply operation, the combination comprising:

a data register having a plurality of ordered stages, each stage comprising a bistable element having input set and clear gates for receiving the true and the complement, respectively, ordered-bit representations of the associated like-ordered bits of a multibit data word;

an instruction register having a plurality of ordered stages for receiving the ordered-bit representations of the associated like-ordered bits of a multibit instruction word, a plurality of said bits defining a function code portion of said instruction word;

a function code translator;

a data register timer;

means coupling the function code portion of said instruction word register to said function code translator for enabling said function code translator to translate said function code and to generate first and second control signals;

means for coupling said first and second control signals from said function code translator to said data register timer;

set timing means for coupling, in parallel, the set gates of said data register stages to said data register timer;

clear timing means for coupling, in parallel, the clear gates of said data register stages to said data register timer;

means for coupling the true and the complement ordered-bit representations of multibit data words to the set and clear gates, respectively, of each like-ordered stage of said data register;

said function code translator first control signal firstly causing said data register timer to firstly simultaneously enable said set timing means and said clear timing means for transferring all the ordered bits of a first data word into the like-ordered stages of said data register; and said function code translator second control signal secondly causing said data register timer to secondly simultaneously enable said clear timing means and disable said set timing means for transferring only the O ordered bits of a second data word into the like-ordered stages of said data register thereby performing a logical multiply operation of said first and second data words.